United States Patent
Clark et al.

(10) Patent No.: US 9,708,515 B2
(45) Date of Patent: Jul. 18, 2017

(54) PROCESS FOR THE PREPARATION OF RADIATION CURABLE COMPOSITIONS

(75) Inventors: Graham Clark, Overijse (BE); Jurgen Van Holen, Mariakerke (BE)

(73) Assignee: Henkel AG & Co. KGaA, Duesseldorf (DE)

( * ) Notice: Subject to any disclaimer, the term of this patent is extended or adjusted under 35 U.S.C. 154(b) by 631 days.

(21) Appl. No.: 14/119,269

(22) PCT Filed: Jul. 6, 2012

(86) PCT No.: PCT/EP2012/063220
§ 371 (c)(1),
(2), (4) Date: Nov. 21, 2013

(87) PCT Pub. No.: WO2013/010813
PCT Pub. Date: Jan. 24, 2013

(65) Prior Publication Data
US 2014/0186541 A1    Jul. 3, 2014

(30) Foreign Application Priority Data
Jul. 19, 2011 (EP) .................................. 11174474

(51) Int. Cl.
| C08J 7/04 | (2006.01) |
| C08G 61/04 | (2006.01) |
| C08F 2/44 | (2006.01) |
| C08L 43/00 | (2006.01) |
| C09J 151/00 | (2006.01) |
| C08F 265/06 | (2006.01) |
| C09J 133/14 | (2006.01) |
| C09J 7/02 | (2006.01) |

(52) U.S. Cl.
CPC ......... C09J 151/003 (2013.01); C08F 265/06 (2013.01); C09J 7/0217 (2013.01); C09J 133/14 (2013.01); C09J 151/00 (2013.01)

(58) Field of Classification Search
CPC .... C09J 151/00; C09J 151/003; C09J 7/0217; C09J 133/14; C08F 220/28; C08F 265/06

USPC ........ 427/505, 516, 496, 487, 457; 524/853, 524/852, 849, 1; 520/1
See application file for complete search history.

(56) References Cited

U.S. PATENT DOCUMENTS

| 4,082,816 A | 4/1978 | Fisk et al. |
| 4,181,752 A | 1/1980 | Martens et al. |
| 4,243,500 A | 1/1981 | Glennon |
| 4,364,972 A | 12/1982 | Moon |
| 4,368,320 A | 1/1983 | Aldinger et al. |
| 4,720,528 A | 1/1988 | Etzell et al. |
| 4,921,934 A | 5/1990 | Bixler et al. |
| 5,082,922 A | 1/1992 | Brandenburger et al. |
| 5,741,435 A | 4/1998 | Beetz, Jr. et al. |
| 5,879,759 A | 3/1999 | Zang |
| 6,162,886 A * | 12/2000 | Bremer ............... C08F 220/28 525/329.5 |
| 6,436,532 B1 | 8/2002 | Moon et al. |
| 6,566,466 B1 | 5/2003 | Zajaczkowski |
| 2007/0110902 A1* | 5/2007 | Johnson .................. B05D 7/14 427/372.2 |
| 2007/0142591 A1 | 6/2007 | Johnson |
| 2010/0086705 A1* | 4/2010 | Everaerts ............... C09J 171/02 428/1.54 |

FOREIGN PATENT DOCUMENTS

| EP | 0044393 A2 | 1/1982 |
| EP | 0 856 533 | 8/1998 |

OTHER PUBLICATIONS

International Search Report issued Sep. 14, 2012 in International (PCT) Application No. PCT/EP2012/063220.

* cited by examiner

*Primary Examiner* — Jessica E Whiteley
(74) *Attorney, Agent, or Firm* — James E. Piotrowski

(57) ABSTRACT

The present invention relates to a process for the preparation of a radiation curable composition comprising at least one (meth)acrylic copolymer A and at least one radiation curable compound B, said process comprising a first copolymerization step, and a subsequent ring opening step.

21 Claims, No Drawings

PROCESS FOR THE PREPARATION OF RADIATION CURABLE COMPOSITIONS

The present invention relates to a process for the preparation of radiation curable compositions as well as their use for making adhesives and/or pressure sensitive adhesives.

There are three common families of pressure sensitive adhesives (PSA), solvent based PSA's, water based PSA's and hot-melt PSA's. Solvent based PSA's contain the PSA formulation dissolved in a volatile solvent while water based PSA's contain the PSA formulation in an emulsion or suspension in water. In both cases, the solution, suspension or emulsion is generally coated onto a release liner, face stock or substrate, then the solvent or water is evaporated to leave the PSA in its dry form. Hot-melt PSA's on the other hand are high solid content systems where the PSA formulation is in the form of a high viscosity liquid, the viscosity of the liquid being temperature dependent. The hot-melt is applied to the release liner, face stock or substrate at a temperature where the hot-melt viscosity is low enough for it to be coatable, for existing commercially available hot-melt PSA's coating is typically done at temperatures of 150° C. or higher. On cooling, the final PSA properties are achieved.

Solvent based PSA's contain up to 60% solvent or more in some special cases. They have excellent properties such as peel and shear as molecular weight can be controlled precisely and ionic cross-linking systems can be used which only become active after solvent evaporation. They are currently the major option in many high performance applications. It is currently not possible to match the performance of solvent based acrylic PSA's with water based or hot-melt products.

Solvent based PSA's, however, suffer from a number of major shortcomings. They are not aligned with current concerns for industry to reduce solvent and $CO_2$ emissions. The processing of solvent based PSA's has a significant cost associated with it and is time consuming. Large thermal drying ovens are required for the processing of these systems, which involve long production times and high energy consumptions to evaporate large volumes of solvents which then have to be dealt with safely. In addition, the solvents which are typically used are flammable and there is a real risk of fire or explosion. More importantly, such processes cannot remove solvent completely under normal production conditions and the end-product usually contains some residual solvents which can result in the emission of solvent vapors after the application leading to outgassing issues in the final use.

The use of water based systems overcomes the problems associated with using flammable solvents however coating using water based systems has its own set of associated problems such as removal of water which is less volatile than the solvents.

Furthermore, the layer thicknesses which can be achieved in a single pass using solvent based or water based systems is limited due to the difficulties associated with removing water or solvents from thicker coating layers. For thicknesses above around 100 μm multiple passes through the coating machine must be performed or the dried PSA must be laminated in a subsequent step.

Therefore, a solvent-less process is more desirable for production of PSA's because it involves 100% convertible materials with a simpler, safer and a more economical manufacture process. A way to improve the solvent-less hot-melt PSA's performances to a level which is closer to the solvent based PSA's is to cure the coating after application. Curing cannot be achieved using conventional thermal methods as the high application temperature would lead to premature curing in the application equipment. One method of achieving a non thermal cure is by using radiation curing. Radiation curable PSA's show very good performance, the radiation curing process has an inherently low carbon footprint. They therefore have the potential to replace solvent based products in demanding applications. To date the technical performance of radiation curable PSA's has not been optimized and there are only a limited number of products on the market.

Hence, a solvent-less process for production of radiation curable adhesives having improved performances is more desirable. There are several prior arts that describe different solvent-less processes for making radiation curable adhesives.

U.S. Pat. No. 4,181,752 and U.S. Pat. No. 4,364,972 describe a solvent-less process wherein a coatable syrup is formed by prepolymerization of a monomer mixture, so that a small degree of polymerization has taken place. The syrup obtained containing a significant amount of unreacted monomers can be applied to a substrate and the remainder of the polymerization is further conducted by irradiation.

U.S. Pat. No. 5,879,759 describes a process wherein a coatable syrup is formed by partial polymerization of a monomer mixture upon irradiation. In this case, the coatable syrup is formulated in a second step with other monomers or oligomers and further irradiated to provide a copolymer having pressure sensitive adhesive properties.

In U.S. Pat. No. 6,436,532, a special irradiation scheme is described. A mixture of monomers or a prepolymerized syrup is irradiated with electromagnetic radiation first at a relatively low average intensity and subsequently at a higher average intensity.

In U.S. Pat. No. 4,243,500 and U.S. Pat. No. 5,741,435 pressure sensitive adhesives are formed by a different solvent-less process wherein polymers are mixed with free monomers which function as reactive solvents. The resulting coatable mixture can be further exposed to irradiation which induces copolymerization or crosslinking of the monomer and of the polymers.

However the known solvent-less processes do not allow for polymerizing the systems into high molecular weight end-products in the curing time frames usually encountered in the conventional production conditions and hence high performance PSA's cannot be obtained.

On the other hand, U.S. Pat. No. 4,082,816, U.S. Pat. No. 4,368,320, U.S. Pat. No. 5,082,922 and US 2007/0142591 describe the use of cyclic compounds such as lactones or lactams in the preparation of polymers. The cyclic compound is used at different steps of the preparation to obtain polymers bearing side chains obtained by the ring opening of the cyclic compound. The syntheses are performed in the presence of a solvent.

Similarly, EP 0 856 533, U.S. Pat. No. 4,921,934 and U.S. Pat. No. 4,720,528 also disclose the preparation of polymers modified by ring opening reaction with a cyclic compound that can take place at different stages of the polymer preparation. The disclosed processes make use of solvents, as well.

In U.S. Pat. No. 6,566,466, a ring opening monomer such as a lactone or a lactam is used as liquid diluent for the preparation of a polymer. The diluent is non reactive under the polymerization conditions used to prepare the polymer. The system can then be cured by reaction of the ring opening monomer with co-reactive moieties present on the polymer or on a crosslinking agent.

However, in none of the above processes, is the cyclic compound used in a first copolymerization step as a diluent and then reacted with a radiation curable compound having a group reactive towards the cyclic compound in a subsequent ring opening step. So, none of the above processes discloses the formation of a radiation curable adduct between the cyclic compound and a radiation curable compound and hence none of the above processes discloses the preparation of a radiation curable composition.

Hence, there is still a need to overcome the disadvantages and limitations that exist with both solvent based or water based processes and solvent-less processes for production of radiation curable adhesives.

In accordance with the present invention, the applicant has now discovered a new process for the preparation of radiation curable adhesive compositions that overcomes the above cited disadvantages.

The present invention therefore relates to a process for the preparation of a radiation curable composition comprising at least one (meth)acrylic copolymer A and at least one radiation curable compound B, said process comprising:

(a) in a first copolymerization step, the preparation of a (meth)acrylic copolymer in the presence of at least one non-copolymerizable cyclic compound (b1) containing at least one

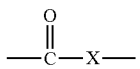

group in the cycle where X=O or NH, by copolymerization of a monomer mixture M comprising:
  (i) from 40 to 95 wt % of at least one (meth)acrylic monomer (a1),
  (ii) from 5 to 60 wt % of at least one other copolymerizable monomer (a2) different from (meth)acrylic monomer (a1), with the proviso that said monomers (a1)) and (a2) contain no functional group that can react with the cyclic compound (b1) during copolymerization,
  (iii) optionally from 0 to 20 wt % of at least one copolymerizable monomer (a3) containing at least one functional group that can react with the cyclic compound (b1),
  (iv) optionally from 0 to 5 wt % of at least one copolymerizable monomer (a4) containing at least one cyclic anhydride,
(b) in a subsequent ring opening step, the preparation of the radiation curable compound B by the ring opening of the cyclic compound (b1) with at least one radiation curable compound (a5),
the percentages by weight (wt %) are herein relative to the total weight of the monomer mixture M.

The term "(meth)acryl" used in the present invention is to be understood as to encompass both the terms "acryl" and "methacryl" and refers to compounds comprising at least one acrylate group (CH2=CHCOO—) and/or at least one methacrylate group (CH2=CCH3COO—). When both acrylate groups and methacrylate groups are present, they can be present on the same or on different compounds.

Words importing the singular number also include the plural and vice versa.

The non-copolymerizable cyclic compound (b1) is preferably a compound that does not copolymerize with monomers of the monomer mixture M under the copolymerization conditions. The non-copolymerizable cyclic compound (b1) comprises advantageously one

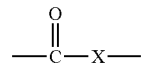

group in the cycle, more advantageously one wherein X is oxygen. Suitable cyclic compounds (b1) include lactones, lactams, lactides, cyclic carbonates and mixtures thereof. Preferred cyclic compounds (b1) are lactones and lactides and mixtures thereof. Particularly preferred are lactones such as ε-caprolactone, δ-valerolactone, γ-butyrolactone, and lactones of hydroxycarboxylic acids such as 2-hydroxycarboxylic acids, e.g. glycolic acid and lactic acid, 3-hydroxycarboxylic acids, e.g. 3-hydroxypropionic acid, 3-hydroxybutyric acid, 3-hydroxyvaleric acid and hydroxypivalic acid. More preferred are ε-caprolactone, δ-valerolactone, γ-butyrolactone and mixtures thereof, most preferred is ε-caprolactone.

In a particular variant of the process according to the invention, at least two different non-copolymerizable cyclic compounds (b1) are used, preferably at least two different lactones, more preferably mixtures of ε-caprolactone and δ-valerolactone are used.

The (meth)acrylic monomer (a1)) is generally used in an amount from 40 to 94.5 wt % of the monomer mixture M. The amount of (meth)acrylic monomer (a1)) is preferably at least 45 wt %, more preferably at least 50 wt %, preferably it does not exceed 94 wt %, more preferably it does not exceed 80 wt %, most preferably it does not exceed 70 wt %. The (meth)acrylic monomer (a1)) is preferably selected from alkyl(meth)acrylates whose homopolymers have a Tg (glass transition temperature) of at most −30° C. The alkyl (meth)acrylates are preferably selected from linear and branched aliphatic alkyl(meth)acrylates, more preferably from those having from 3 to 20 carbon atoms in the alkyl group. Particularly preferred are n-butylacrylate, iso-octylacrylate, 2-ethyl hexylacrylate and mixtures thereof. The Tg is determined according to ASTM E1356-08. The measurements are conducted on a DSC823e instrument of Mettler at a heating rate of 10° C./min. The DSC cell is purged with nitrogen gas at a flow rate of 50 ml/min and the sample mass is about 10 mg. The Tg is estimated from a heat flow-temperature thermogram as the midpoint of the transition.

The copolymerizable monomer (a2) is generally used in an amount from 5 to 59.5 wt % of the monomer mixture M. The amount of copolymerizable monomer (a2) used is preferably at least 10 wt %, more preferably at least 20 wt %, preferably it does not exceed 59 wt %, more preferably it does not exceed 50 wt %, most preferably it does not exceed 40 wt %. The copolymerizable monomer (a2) is generally a compound containing at least one copolymerizable carbon-carbon double bond. Copolymerizable carbon-carbon double bonds are known to the skilled person and include (meth)acrylate, vinyl, allyl types of double bonds The copolymerizable monomer (a2) is preferably selected from monomers whose homopolymers have a Tg of more than −30° C. Suitable copolymerizable monomers (a2) are linear and branched aliphatic alkyl(meth)acrylates, especially those having from 1 to 20 carbon atoms in the alkyl group, glycidyl(meth)acrylate, vinyl acetate, styrene and mixtures thereof. Particularly preferred are methyl(meth) acrylate, ethyl(meth)acrylate, tert-butyl(meth)acrylate, vinyl acetate, styrene and mixtures thereof.

The monomers (a1) and (a2) do not contain any functional group that can react with the cyclic compound (b1) under the copolymerization conditions such as hydroxyl, carboxylic acid, amine, thiol groups.

The ratio of monomers (a1)) and (a2) is such that the Tg of the copolymer obtained based on (a1)) and (a2) is from −60° C. to 20° C., preferably from −40° C. to 0° C.

When present, the copolymerizable monomer (a3) is generally used in an amount from 0.5 to 20 wt % of the monomer mixture M. The amount of copolymerizable monomer (a3) used is preferably at least 1 wt %, more preferably at least 1.5 wt %, preferably it does not exceed 10 wt %, more preferably it does not exceed 7 wt %. The copolymerizable monomer (a3) is generally a compound containing at least one copolymerizable carbon-carbon double bond and at least one functional group that can react with the cyclic compound (b1). Copolymerizable carbon-carbon double bonds are those mentioned supra in relation with (a2). The functional groups that can react with the cyclic compound (b1) are known to the skilled person and include hydroxyl, carboxylic acid, amine, thiol groups. A first preferred category of copolymerizable monomers (a3) are those containing hydroxyl groups such as (meth)acrylates containing one hydroxyl group, especially hydroxyalkyl(meth)acrylates, the ethoxylated and/or propoxylated derivatives thereof, the adducts thereof with lactones, polyalkoxy monohydroxy mono(meth)acrylates. Particularly preferred are hydroxyalkyl(meth)acrylates having from 1 to 20 carbon atoms in the alkyl group, the ethoxylated and/or propoxylated derivatives thereof, the adducts thereof with lactones, polyalkoxy monohydroxy mono(meth)acrylates. Examples of such compounds comprise hydroxyethyl (meth)acrylate, hydroxypropyl(meth)acrylate, hydroxybutyl (meth)acrylate, hydroxypentyl (meth)acrylate, hydroxyheptyl (meth)acrylate, hydroxnonyl(meth)acrylate, hydroxydecyl(meth)acrylate, their position isomers, the ethoxylated and/or propoxylated derivatives thereof, the adducts thereof with lactones, diethylene glycol mono(meth) acrylate, polyethylene glycol mono(meth)acrylate, propylene glycol mono(meth)acrylate, polypropylene glycol mono (meth)acrylate. A second preferred category of copolymerizable monomers (a3) are those containing carboxylic acid groups, and mixtures of any of them. Examples of such compounds are (meth)acrylic acid, β-carboxyethyl (meth)acrylate, crotonic acid, maleic acid, fumaric acid, itaconic acid. Mixtures of any of the above copolymerizable monomers (a3) can be used. More preferred copolymerizable monomers (a3) are 2-hydroxyethyl(meth)acrylate, 2-hydroxybutyl(meth)acrylate, 4-hydroxybutyl(meth)acrylate, and mixtures thereof. Most preferred are 2-hydroxyethylacrylate, 2-hydroxybutylacrylate, 4-hydroxybutylacrylate, and mixtures thereof.

When present, the copolymerizable monomer (a4) is generally used in an amount from 0.5 to 5 wt % of the monomer mixture M. The amount of copolymerizable monomer (a4) used is preferably at least 0.7 wt %, more preferably at least 1 wt %, preferably it does not exceed 4 wt %, more preferably it does not exceed 3 wt %. The copolymerizable monomer (a4) is a compound containing at least one copolymerizable carbon-carbon double bond and at least one cyclic anhydride. Copolymerizable carbon-carbon double bonds are those mentioned supra in relation with (a2). Suitable copolymerizable monomers (a4) include maleic anhydride, itaconic anhydride, 4-methacryloyloxyethyl trimellitate anhydride and mixtures thereof. Preferred copolymerizable monomers (a4) are maleic anhydride and itaconic anhydride and mixture thereof. Most preferred copolymerizable monomer (a4) is maleic anhydride.

The radiation curable compound (a5) is generally a compound containing at least one radiation curable carbon-carbon double bond and at least one functional group that can react with the cyclic compound (b1). Radiation curable carbon-carbon double bonds are known to the skilled person and include (meth)acrylate, vinyl, allyl types of double bonds. The functional groups are those mentioned supra in relation with (a3). A first preferred category of radiation curable compounds (a5) are those containing hydroxyl groups such as (meth)acrylates containing one hydroxyl group, especially hydroxyalkyl(meth)acrylates, the ethoxylated and/or propoxylated derivatives thereof, the adducts thereof with lactones, polyalkoxy monohydroxy (meth)acrylates. Particularly preferred are hydroxyalkyl(meth)acrylates having from 1 to 20 carbon atoms in the alkyl group, the ethoxylated and/or propoxylated derivatives thereof, the adducts thereof with lactones, polyalkoxy monohydroxy (meth)acrylates. Examples of such compounds comprise hydroxyethyl(meth)acrylate, hydroxypropyl(meth)acrylate, hydroxybutyl(meth)acrylate, hydroxypentyl(meth)acrylate, hydroxyheptyl(meth)acrylate, hydroxnonyl(meth)acrylate, hydroxydecyl(meth)acrylate, their position isomers, the ethoxylated and/or propoxylated derivatives thereof, the adducts thereof with lactones, diethylene glycol mono(meth) acrylate, polyethylene glycol mono(meth)acrylate, propylene glycol mono(meth)acrylate, polypropylene glycol mono (meth)acrylate. A second preferred category of radiation curable compounds (a5) are those containing carboxylic acid groups, and mixtures of any of them. Examples of such compounds are (meth)acrylic acid, β-carboxyethyl(meth) acrylate, crotonic acid, maleic acid, fumaric acid, itaconic acid. Mixtures of any of the above radiation curable compounds (a5) can be used. More preferred radiation curable compounds (a5) are 2-hydroxyethyl(meth)acrylate, 2-hydroxybutyl(meth)acrylate, 4-hydroxybutyl(meth)acrylate, and mixtures thereof. Most preferred are 2-hydroxyethylacrylate, 2-hydroxybutylacrylate, 4-hydroxybutylacrylate, and mixtures thereof. The radiation curable compound (a5) can be the same or different from copolymerizable monomer (a3).

In the copolymerization step (a) of the process according to the invention, generally:
(i) from 5 to 60 wt % of cyclic compound (b1), and
(ii) from 40 to 95 wt % of the monomer mixture M
are used, the wt % are herein relative to the total weight of cyclic compound (b1) and monomer mixture M.

The process according to the invention can take place in the presence of a solvent. By solvent is meant any substance that is capable of dissolving another substance to form a uniformly dispersed mixture at the molecular or ionic size, the solvent is not reactive under the curing conditions and has generally to be removed from the liquid composition either before or after curing.

The process according to the invention preferably takes place in the absence of substantial amounts of solvent, usually less than 1% of solvent relative to the sum of monomer mixture M and cyclic compound (b1).

The process according to the invention can take place in the presence of water. It preferably takes place in the absence of substantial amounts of water, usually less than 1% of water relative to the sum of monomer mixture M and cyclic compound (b1).

The amount of cyclic compound (b1) used is preferably at least 10 wt %, more preferably at least 15 wt %; preferably it does not exceed 55 wt %, more preferably it does not exceed 50 wt %.

The amount of monomer mixture M used is preferably at least 45 wt %, more preferably at least 50 wt %, preferably it does not exceed 90 wt %, more preferably it does not exceed 85 wt %.

The (meth)acrylic copolymer prepared by copolymerizing in a first step (the "copolymerization step") the monomer mixture M, in the presence of the cyclic compound (b1), may be a random, alternating or block copolymer. It is preferably a random copolymer.

The copolymerization in the copolymerization step may take place by free-radical copolymerization. This may take place in a manner known to the skilled person by conventional methods, particularly by free-radical polymerization using thermal radical initiators. Examples of suitable thermal radical initiators include peroxides, such as benzoyl peroxide, azo compounds, such as azo-bis-isobutyronitrile, azo-bis-dimethylpentanenitrile, azo-bis-methylbutyronitrile, azo-bis-cyanocyclohexane. The initiators may be used, for example, in amounts from 0.05 to 2.0 wt % of the monomer mixture M.

To achieve a good control of the molecular weight and its distribution, a chain transfer agent, preferably of the mercaptan type, such as n-dodecylmercaptan, tert-dodecanethiol, iso-octylmercaptan, n-octylmercaptan or of the carbon halide type, such as carbon tetrabromide, bromotrichloromethane, can also be added in the course of the reaction. The chain transfer agent is generally used in amounts of up to 5 wt % of the monomer mixture M.

The copolymerization is generally carried out at a temperature from 60 to 150° C., preferably under an inert gas atmosphere. The copolymerization is preferably carried out at a temperature from 60 to 100° C.

The copolymerization step is followed by a subsequent step (the "ring opening step") wherein the ring of the cyclic compound (b1) is opened by reaction with the functional group of the radiation curable compound (a5) to form the radiation curable compound B. The ring opening generates the radiation curable compound bearing a functional end group W, wherein the group W is a hydroxyl, carboxylic acid or primary amine. The ratio of cyclic compound (b1) to functional groups of radiation curable compound (a5) is from 1:1 to 6:1, more preferably from 2:1 to 5:1 expressed in equivalent of cyclic group to equivalent of functional group (equivalent ratio).

The ring opening step is generally carried out at a temperature from 80 to 150° C. The ring opening reaction can take place without the use of a catalyst, but the reaction rate in this case is relatively low. Therefore, the ring opening reaction preferably takes place in the presence of at least one catalyst. Suitable catalysts include alkali or alkaline earth metal alkoxides, organic acids, inorganic acids and Lewis acids such as sodium methoxide, calcium methoxide, aluminum isopropoxide, tetraalkyl titanates, titanium chelates, titanium acylates, lead salts, lead oxides, zinc borate, antimony oxide, stannous octoate, tin laurate, tin octoate, sulfuric acid, hydrochloric acid, phosphoric acid, boron trifluoride. The catalyst can be used in amounts of up to 1000 ppm based on the sum of the monomer mixture M, cyclic compound (b1) and radiation curable compound (a5).

As will be apparent to the skilled person, depending on the equivalent ratio of cyclic compound (b1) to the functional groups of (a5) and on the reaction conditions, some oligomerization or polymerization of the cyclic compound can take place. The molecular weight and molecular weight distribution of the radiation curable compound B obtained depend also on the equivalent ratio of cyclic compound to the functional groups and on the reaction conditions.

In a variant of the present invention where only one non-copolymerizable cyclic compound (b1) is used, the equivalent ratio of cyclic compound to the functional groups and the reaction conditions are such that a compound B comprising on average at most 4 repeating units is obtained.

A first preferred embodiment of the present invention relates to a process wherein the monomer mixture M of step (a) comprises:

(i) from 40 to 94.5 wt % of (meth)acrylic monomer (a1),
(ii) from 5 to 59.5 wt % of copolymerizable monomer (a2),
(iii) from 0.5 to 20 wt % of copolymerizable monomer (a3),
(iv) optionally from 0 to 5 wt % of copolymerizable monomer (a4), in order to prepare a (meth)acrylic copolymer comprising functional groups originating from copolymerizable monomer (a3) that can react with the cyclic compound (b1), and where the process further comprises a grafting step (c) wherein at least part of said functional groups are reacted with a part of the cyclic compound (b1).

The grafting step (c) leads to the formation of a grafted (meth)acrylic copolymer A by ring opening reaction of a part of the cyclic compound (b1) with the functional group originating from monomer (a3). As mentioned supra, the ring opening reaction can take place in the absence of a catalyst, but preferably takes place in the presence of a catalyst. The catalyst may be the same or different from the catalyst used in step (b), it is preferably the same. The total amount of catalyst used is up to 1000 ppm based on the sum of the monomer mixture M, cyclic compound (b1) and radiation curable compound (a5). The grafting step is generally carried out at a temperature from 80° C. to 150° C. The remaining part of the cyclic compound (b1) reacts with the radiation curable compound (a5) to form the radiation curable compound B through the ring opening step (b). The equivalent ratio of cyclic compound (b1) to the sum of the functional groups of copolymerizable monomer (a3) and radiation curable compound (a5) is preferably from 1:1 to 6:1, more preferably from 2:1 to 5:1.

As will be apparent to the skilled person, depending on the equivalent ratio of cyclic compound to the sum of the functional groups of (a3) and (a5) and on the reaction conditions, some oligomerization or polymerization of the cyclic compound can take place. The molecular weight and molecular weight distribution of the grafted chains depend also on the equivalent ratio of cyclic compound to the functional groups and on the reaction conditions.

In a particular variant of this first embodiment where only one non-copolymerizable cyclic compound (b1) is used, the equivalent ratio of cyclic compound to the functional groups and the reaction conditions are such that a grafted (meth)acrylic copolymer A having grafted chains comprising on average at most 4 repeating units is obtained.

In a preferred variant of this first embodiment, the grafting step (c) is conducted after the copolymerization step (a). In this variant, the catalyst is preferably added at the end of the copolymerization step (a). The radiation curable compound (a5) is preferably added together or after the catalyst addition and at the latest before the total consumption of the cyclic compound (b1) so that a part of (b1) is available to react with the radiation curable compound (a5) in the ring opening step (b). The grafting step (c) is more preferably conducted at least partially before the ring opening step (b).

A second preferred embodiment of the present invention relates to a process wherein the monomer mixture M of step (a) comprises:
(i) from 40 to 94.5 wt % of monomer (a1),
(ii) from 5 to 59.5 wt % of copolymerizable monomer (a2),
(iii) optionally from 0 to 20 wt % of copolymerizable monomer (a3),
(iv) from 0.5 to 5 wt % of copolymerizable monomer (a4),
in order to prepare a (meth)acrylic copolymer comprising cyclic anhydride groups originating from copolymerizable monomer (a4),
and where the process further comprises an adduct formation step (d) wherein at least part of the cyclic anhydride groups is reacted with at least one radiation curable compound (a6).

In this second embodiment, when present, the copolymerizable monomer (a3) is more preferably (meth)acrylic acid.

The radiation curable compound (a6) is generally a compound containing at least one radiation curable carbon-carbon double bond and at least one functional group that can react with the cyclic anhydride group originating from (a4) such as hydroxyl, amine, thiol groups. Radiation curable carbon-carbon double bonds are known to the skilled person and include (meth)acrylate, vinyl, allyl types of double bonds. Preferred radiation curable compound (a6) are those containing hydroxyl groups such as (meth)acrylates containing one hydroxyl group, especially hydroxyalkyl(meth)acrylates, the ethoxylated and/or propoxylated derivatives thereof, the adducts thereof with lactones, polyalkoxy monohydroxy (meth)acrylates. Particularly preferred are hydroxyalkyl(meth)acrylates having from 1 to 20 carbon atoms in the alkyl group, the ethoxylated and/or propoxylated derivatives thereof, the adducts thereof with lactones, polyalkoxy monohydroxy (meth)acrylates. Examples of such compounds comprise hydroxyethyl(meth)acrylate, hydroxypropyl(meth)acrylate, hydroxybutyl(meth)acrylate, hydroxypentyl(meth)acrylate, hydroxyheptyl(meth)acrylate, hydroxynonyl(meth)acrylate, hydroxydecyl(meth)acrylate, their position isomers, the ethoxylated and/or propoxylated derivatives thereof, the adducts thereof with lactones, diethylene glycol mono(meth)acrylate, polyethylene glycol mono(meth)acrylate, propylene glycol mono(meth)acrylate, polypropylene glycol mono(meth)acrylate. Mixtures of any of the above radiation curable compounds (a6) can be used. More preferred radiation curable compounds (a6) are 2-hydroxyethyl(meth)acrylate, 2-hydroxybutyl(meth)acrylate, 4-hydroxybutyl(meth)acrylate, and mixtures thereof. Most preferred are 2-hydroxyethylacrylate, 2-hydroxybutylacrylate, 4-hydroxybutylacrylate, and mixtures thereof. The radiation curable compound (a6) might be the same or different from the monomers (a3) and (a5), preferably the radiation curable compounds (a5) and (a6) are the same.

According to a particular variant of this second embodiment of the process according to the invention wherein the functional end group W of the radiation curable compound B is a hydroxyl or a primary amine, at least part of radiation curable compound B is used as radiation curable compound (a6). In this particular variant, the adduct formation step (d) is conducted together or after the ring opening step (b). In this particular variant, it is preferred to use a mixture of compound B and at least one other compound (a6) as described above.

The adduct formation step (d) is conducted by opening of the cyclic anhydride group provided by monomer (a4) with the functional group of compound (a6) leading to the formation of a (meth)acrylic copolymer A comprising radiation curable groups and carboxylic acid groups. The reaction can take place in the absence of a catalyst, but preferably takes place in the presence of a catalyst. Useful catalysts are known to the skilled person and can be chosen amongst acids or bases. The catalyst can be the same or different from the catalyst used at the ring opening step (b) or both at the ring opening step (b) and grafting step (c), it is preferably the same. The total amount of catalyst used generally is up to 1000 ppm based on the sum of the monomer mixture M, cyclic compound (b1) and radiation curable compounds (a5) and (a6). The adduct formation step is generally carried out at a temperature from 80 to 140° C. The amount of radiation curable monomer (a6) is such that the equivalent ratio of functional groups of compound (a6) to cyclic anhydride groups is at least 0.5:1, more preferably at least 0.7:1. Generally it does not exceed 2:1, more preferably it does not exceed 1.5:1. Most preferably, it is about 1:1.

In a third preferred embodiment of the present invention, the process further comprises a capping step (e) wherein the functional end group W formed by the ring opening of the cyclic compound (b1) at the ring opening step (b) or both at the ring opening step (b) and grafting step (c), is capped with at least one capping compound containing at least one functional group Y capable of reacting with the functional end group W.

In a particular variant of this third embodiment of the present invention, when the functional end group W is a hydroxyl or a primary amine, the capping compound is preferably a mono-, a di- or a polyisocyanate, more preferably a diisocyanate. When a diisocyanate is used, the copolymerizable monomer (a3), when present, is preferably (meth)acrylic acid.

A fourth particular embodiment of the present invention consists in any combination of the first, second and third preferred embodiments. A preferred combination is the combination of the second and third embodiments of the present invention.

In a particular variant of the process according to the invention and of the first and third embodiments of the present invention, the radiation curable compositions are advantageously free of acidic species to avoid corrosion phenomena, especially in final applications where the compositions are in contact with metal, conductive metal oxides or other conductive materials. In this case, the copolymerizable monomer (a3) and the radiation curable compound (a5) advantageously do not contain any carboxylic acid group.

The process according to the invention permits to obtain radiation curable compositions comprising:
(i) from 30 to 95 wt % of (meth)acrylic copolymer A, and
(ii) from 5% to 70 wt % of radiation curable compound B,
the wt % are herein relative to the total weight of (meth)acrylic copolymer A and of radiation curable compound B.

The process according to the invention more specifically permits to obtain radiation curable compositions comprising:
(i) from 30 to 93 wt % of (meth)acrylic copolymer A, and
(ii) from 7 to 70 wt % of radiation curable compound B,
the wt % are herein relative to the total weight of (meth)acrylic copolymer A and of radiation curable compound B.

The process according to the invention presents several advantages.

The use of a cyclic compound (b1) as diluent during the copolymerization step allows both avoiding the use of a solvent and obtaining a (meth)acrylic copolymer (A) having a relatively high molecular weight. The reaction of the cyclic compound (b1) with a radiation curable compound (a5) during the ring opening step advantageously allows its transformation into a radiation curable compound B. At first the radiation curable compound B renders the final composition radiation curable. Secondly, by its transformation into a radiation curable compound B, the cyclic compound used as a diluent in the copolymerization step has not to be removed from the composition unlike a solvent, but will become part of the network upon curing of the composition.

The process according to the invention permits to obtain radiation curable compositions which present a combination of properties that makes them particularly suitable for making adhesives, especially pressure sensitive adhesives.

The process according to the invention permits to obtain radiation curable compositions substantially free of solvent, generally comprising typically less than 1 wt % of solvent based on the total weight of the composition. The compositions advantageously comprise less than 0.5 wt % of solvent. By solvent is meant any substance that is capable of dissolving another substance to form a uniformly dispersed mixture at the molecular or ionic size, the solvent is not reactive under the curing conditions and has generally to be removed from the liquid composition either before or after curing.

The process according to the invention permits to obtain radiation curable compositions substantially free of water, generally comprising typically less than 1 wt % of water based on the total weight of the composition. The compositions advantageously comprise less than 0.5 wt % of water.

The process according to the invention permits to obtain (meth)acrylic copolymer A having relatively high molecular weight. The weight average molecular weight of (meth) acrylic copolymer A preferably ranges from 10 to 500 kDa, more preferably from 30 to 300 KDa. The weight-average molecular weight (Mw) is determined by conventional gel permeation chromatography (GPC) with polystyrene standards EasyCal from Polymer Laboratories (Molecular Weight range: 200-7,500,000 g/mol). A small portion of sample is dissolved in tetrahydrofuran (THF) and injected into a liquid chromatograph (Merck-Hitachi L7100) equipped with 4 PLGel Mixed-A polystyrene-divinylbenzene GPC columns (300 mm×7.5 mm×20 µm). The components of the sample are separated by the GPC columns based on their molecular size in solution and detected by a Refractive Index detector. Data are gathered and processed by Polymer Laboratories Cirrus GPC software.

The present invention also relates to radiation curable compositions obtainable by the process according to the invention as previously described, more specifically comprising:
(i) from 30 to 93 wt % of (meth)acrylic copolymer A, and
(ii) from 7 to 70 wt % of radiation curable compound B, the wt % are herein relative to the total weight of (meth) acrylic copolymer A and of radiation curable compound B.

The radiation curable compositions preferably comprise at least 35 wt % of (meth)acrylic copolymer A more preferably at least 40 wt %, preferably they do not comprise more than 90 wt % of (meth)acrylic copolymer A, more preferably not more than 85 wt %. The radiation curable compositions preferably comprise at least 10 wt % of radiation curable compound, B more preferably at least 15 wt %, preferably it does not comprise more than 65 wt % of radiation curable compound (B), more preferably not more than 60 wt %.

The process according to the invention may also comprise at least one step wherein the compositions such as described here above are mixed with at least one radiation curable compound C to obtain radiation curable compositions comprising:
(i) from 50 to 100 wt % of the radiation curable composition comprising the (meth)acrylic copolymer A and the radiation curable compound B, and
(ii) from 0 to 50 wt % of at least one radiation curable compound C,
the wt % are herein relative to the total weight of (meth) acrylic copolymer A, radiation curable compound B and compound C.

The radiation curable compositions preferably comprise at least 55 wt % of the radiation curable composition comprising the (meth)acrylic copolymer A and the radiation curable compound B, more preferably at least 60 wt %, preferably it does not comprise more than 99.5 wt % of the radiation curable composition comprising the (meth)acrylic copolymer A and the radiation curable compound B, more preferably not more than 99 wt %. The radiation curable compositions preferably comprise at least 0.5 wt % of compound C, more preferably at least 1 wt %, preferably it does not comprise more than 45 wt % of compound C, more preferably not more than 40 wt %.

The radiation curable compound C is generally selected from (meth)acrylated oligomers, from (meth)acrylated monomers and from mixtures thereof. It can be the same or different from radiation curable compound B.

The (meth)acrylated oligomers are generally selected from the group of polyester (meth)acrylate oligomers, polyether (meth)acrylate oligomers, epoxy (meth)acrylate oligomers, polycarbonate (meth)acrylate oligomers, (meth) acrylated polycaprolactone oligomers, urethane (meth)acrylate oligomers, (meth)acrylated (meth)acrylic oligomers, amine (meth)acrylate oligomers and any combination thereof.

The (meth)acrylated monomers comprise butyl(meth) acrylate, methyl(meth)acrylate, isobutyl(meth)acrylate, 2-ethylhexyl(meth)acrylate, cyclohexyl(meth)acrylate, n-hexyl(meth)acrylate, isobornyl(meth)acrylate, iso-octyl (meth)acrylate, n-lauryl(meth)acrylate, octyl/decyl(meth) acrylate, 2-hydroxyethyl(meth)acrylate, phenoxyethyl (meth)acrylate, nonylphenolethoxylate mono(meth)acrylate, 2-(-2-ethoxyethoxy)ethyl(meth)acrylate, 2-butoxyethyl (meth)acrylate, N-vinyl pyrrolidone, 1,6-hexanediol diacrylate (HDDA), di- or tri-propylene glycol diacrylate (DPGDA, TPGDA), ethoxylated and/or propoxylated neopentylglycoldi(meth)acrylate, pentaerythritoltriacrylate (PETIA) and the ethoxylated and/or propoxylated derivatives thereof, trimethylolpropanetri(meth)acrylate (TMPTA) and the ethoxylated and/or propoxylated derivatives thereof, di-trimethylolpropanetri(meth)acrylate (diTMPTA) glyceroltri(meth)acrylate and the ethoxylated and/or propoxylated derivatives thereof, bisphenol A di(meth)acrylate and the ethoxylated and/or propoxylated derivatives thereof, phenylglycidylether(meth)acrylate and the ethoxylated or/and propoxylated derivatives thereof, the (meth)acrylates obtained from the esterification with (meth)acrylic acid of aliphatic glycidyl ethers, especially those wherein the alkyl chain comprises from 6 to 24 carbon atoms, more preferably from 8 to 18 carbon atoms, and/or of glycidyl esters of saturated and unsaturated carboxylic acids, especially the glycidyl esters of long chain alkyl carboxylic acids wherein the alkyl chain comprises from 6 to 24 carbon atoms, more preferably from 8 to 18 carbon atoms. The (meth)acrylated monomers further comprise (meth)acrylic acid, beta-carboxyethyl acrylate, monomers resulting from the reaction of $P_2O_5$ with hydroxy group containing (meth)acrylates, especially 2-hydroxyethyl(meth)acrylate. Any mixture of the above listed (meth)acrylated monomers can be used.

The (meth)acrylated monomers are preferably selected from ethoxylated and/or propoxylated neopentylglycoldi (meth)acrylate, pentaerythritoltriacrylate (PETIA) and the ethoxylated and/or propoxylated derivatives thereof, trimethylolpropanetri(meth)acrylate (TMPTA) and the ethoxylated and/or propoxylated derivatives thereof, di-trimethylolpropanetri(meth)acrylate (diTMPTA) glyceroltri(meth) acrylate and the ethoxylated and/or propoxylated derivatives thereof, beta-carboxyethyl acrylate, monomers resulting from the reaction of $P_2O_5$ with hydroxy group containing (meth)acrylates, especially 2-hydroxyethyl(meth)acrylate. Any mixture of the above listed (meth)acrylated monomers can be used.

The radiation curable composition can also contain at least one tackifier. The tackifier may be selected from rosin tackifiers such as rosin acid, polymerized rosin acid, rosin esters and mixtures, and preferably hydrogenated rosin resins; hydrocarbon resins such as aliphatic and/or cycloaliphatic hydrocarbon tackifier resins, and preferably hydrogenated hydrocarbon resin; aromatic/aliphatic tackifier resins and preferably hydrogenated aromatic/aliphatic tackifier resins; polyterpene and terpene phenolic resins; aromatic resins polymerized from styrene, α-methylstyrene, vinyl toluene and mixtures; phenolic modified aromatic resins, benzoate resins, coumarone-indene; low molecular weight polyacrylates.

If tackifiers are present in the composition according to the invention, their quantity is usually from 5% to 50 wt % based on the total weight of the composition.

The radiation curable composition according to the invention usually also contains at least one polymerization inhibitor. Inhibitors include without limitation substituted phenol compounds such as hydroquinone, methyl hydroquinone (THQ), monomethyl ether of hydroquinone (MEHQ), tert-butyl hydroquinone, di-tert-butyl hydroquinone, 2,6-di-tert-butyl-4-methylphenol (BHT), as well as trisphenylphosphite (TPP), trisnonylphenylphosphite (TNPP), phenothiazine (PTZ), triphenyl antimony (TPS), oxalic acid and mixtures thereof.

The total amount of inhibitor used is generally from 0 to 1 wt %, preferably from 0.01 to 0.5 wt % based on the total weight of the composition.

The radiation curable compositions according to the invention may also comprise other additives including pigments, colorants, wetting agents, antioxidants, flow modification agents, fire retardant agents, UV-protection agents, adhesion promoters and mixtures thereof. UV-protection agents can be UV absorbers or HALS stabilizers such as those commercially available under the names DASTIB® 845, TINUVIN® 770, TINUVIN® 765, TINUVIN® 144, TINUVIN® 123, TINUVIN® 371, TINUVIN® 111, TINUVIN® 783, TINUVIN® 292, TINUVIN® 791, TINUVIN® 622, HOSTAVIN® n 24, CYASORB® UV 3346, CYASORB® UV 3529. The total amount of additives does not exceed 20 wt %, preferably it does not exceed 15 wt % based on the total weight of the composition.

The radiation curable compositions may also comprise at least one photochemical initiator and/or chemical initiator, capable of initiating the polymerization of the radiation curable oligomer and optionally the other radiation curable compounds present therein. Photochemical initiators (also called photoinitiators) are compounds that upon photoexcitation can generate radicals that will initiate the polymerization. The photoinitiators are preferably free-radical photoinitiators. In some embodiments of the invention wherein the acrylated compounds are not fully reacted, photoinitiators may also comprise cationic photoinitiators. Typical photoinitiators are described in "The Chemistry of Free Radical Polymerization", edited by Graeme Moad and David H. Solomon; Pergamon (1995), pages 84 to 89. The photoinitiators usable in the compositions used in the invention can be selected from hydroxyketones, aminoketones, benzildimethyl-ketals, acyl phoshines, benzophenone derivatives, thioxanthones and mixtures thereof. Typical examples of these products are those commercialized under the names Irgacure® 149, Irgacure® 184, Irgacure® 369, Irgacure® 500, Irgacure® 651, Irgacure® 784, Irgacure® 819, Irgacure® 907, Irgacure® 1700, Irgacure® 1800, Irgacure® 1850, Irgacure® 2959, Darocur® 1173, Darocur® 4265.

The radiation curable compositions according to the invention are preferably cured by exposure to actinic radiations such as ultraviolet radiations, γ-rays, X-rays or by electron beam.

When cured under UV radiations, curable compositions comprising at least one photoinitiator are preferred. The amount of photoinitiator or chemical initiator is preferably comprised between 0.001 and 10 wt %, more preferably between 0.01 and 5 wt % based on the total weight of the composition. The composition according to the invention may also comprise from 0 to 5 wt % of one or more amine synergist based on the total weight of the composition.

Alternatively, the compositions can be cured in the absence of a photoinitiator, especially when cured by electron beam.

The radiation curable compositions according to the present invention present several advantages.

The radiation curable compositions according to the present invention present good peel and shear performances which make them suitable for making adhesives, especially pressure sensitive adhesives (PSA).

A PSA is a viscoelastic material which remains permanently tacky in a solid solvent-free form, it adheres instantaneously to most solid surfaces with the application of very slight pressure and provides a balance of viscoelastic properties so that both bonding and holding functions are simultaneously displayed at ambient conditions.

The process according to the invention permits to obtain radiation curable compositions whose application is advantageous over the solvent and water based systems in terms of production time, energy consumption, waste generation and treatment and floor space. In addition, the compositions according to the present invention allow thicker layers to be applied and cured in one single pass. Furthermore, in comparison with solvent based systems, they will not give rise to the emission of solvent vapors during and after application this is safer and advantageous for use in applications like automotive and electronics.

The compositions according to the present invention advantageously are lower in viscosity and hence provide a broader formulation window enlarging the possibilities of use, especially in comparison to known hot melt systems and known UV PSA's. They can be applied to heat sensitive substrates such as plastics that are not resistant to the high coating temperatures of the hot melt systems.

In comparison to known solvent-less systems, the process according to the invention permits to obtain (meth)acrylic copolymers A having a relatively high molecular weight. These systems can then be applied and cured at relatively high line speeds within a very short distance.

The radiation curable compositions according to the present invention both uncured and cured are characterized by excellent optical properties such as a high transmission (equal or above 95% for a 50 μm thick film), a high clarity, low haze (haze equal or below 5% for a 50 μm thick film) and a low color (a and b from −1 to 1 for a 50 μm thick film). These characteristics are maintained upon ageing. These characteristics make them particularly suitable for making adhesive and/or pressure sensitive adhesive for use in optical constructions. When used in direct contact with electronic components in optoelectronic applications such as touch screen applications or photovoltaics, the compositions according to the present invention are advantageously free of acidic species.

The radiation curable composition according to the invention allows in depth curing by UV radiations of very thick layers (500 microns and above), especially when the composition is combined with a photoinitiator absorbing in the UV-A wavelength range.

The present invention therefore further relates to a method of preparing an adhesive, especially a pressure sensitive adhesive, comprising the steps of:
 (a) providing a radiation curable composition according to the present invention,
 (b) applying said composition to a substrate,
 (c) exposing said composition to an actinic radiation or electron beam source to cure the said composition.

The present invention further relates to an adhesive and/or pressure sensitive adhesive obtainable from curing a composition according to the invention.

In the method according to the invention, the radiation curable compositions can be applied to the surface by any suitable means, including dip coating, spray coating, slot die, film coating, curtain coating, roll coating or the like. It is preferably applied by slot die or roll coating. The compositions can be applied at any suitable temperature, preferably between 25 and 150° C.

The substrate to be coated can be any substrate, especially paper, metal, release liners, polymeric foams and other polymeric substrates.

The irradiation of the surface can be done by actinic radiations such as ultraviolet radiations, γ-rays, X-rays or electron beam. In the process according to the invention, electron beam and especially ultraviolet radiations are preferred.

The present invention will now be described in detail with reference to the following non limiting examples which are by way of illustration only.

Methods Used:

Test Sample Preparation:

All tapes for the PSA results of Examples 1-14 are made by adhesive transfer. The uncured, liquid PSA composition is drawn down on release paper (Loparex Poly Slik 111/120, Apeldoorn, The Netherlands, roll No. W03180672) or onto optical release liner (Mitsubishi polyester liner 2SLKN or 2HLKN). Drawdowns are made at 100° C. using a Gardco Automatic Drawdown Machine, 30 cm stroke, on the slowest speed (ca. 1.5 m/min), using a Braive Instruments adjustable Bird applicator, typically at 50 μm setting. The composition is UV cured at a conveyer belt speed of 10 m/min with a UV-Fusion lamp BF9 (H-bulb) having a power of 200 watts/cm.

The cooled film is laminated with a 50 μm thick polyester film using two double passes of a 2 kg hard rubber roller. Where optical measurements are to be made the polyester film is of an optical grade and the optical grade release liner is used. The laminate is cut into strips of 2.5 cm by approximately 10 cm.

In Example 15, thick cast films of thickness 500 μm and above were produced by heating the adhesive to 100° C. then pouring it onto optical release liner which is mounted on a sheet of flat glass. A second sheet of optical release liner is placed carefully onto the adhesive and finally a second glass sheet is placed on top of this. Spacers placed at the edges of the glass allow thicknesses of cast PSA to be produced in the range 1 mm to 5 mm (1000 to 5000 μm). On cooling these samples can be removed carefully from between the glass and cured under the UV lamp.

All room temperature performance testing is conducted in a constant temperature/constant humidity controlled room held at 23±2° C., 50±5% relative humidity.

All tests are performed on 50 μm layers of PSA on 50 μm polyester films unless otherwise specified. For testing, the release paper or release liner is removed to allow applying the adhesive strip on the test substrate.

Peel testing: The peel test is a measure of the adhesive strength of an adhesive. The adhesive strips are applied on stainless steel. Peel tests are conducted 20 minutes after application according to EN 1939 on an Instron machine. Results are reported in N per 25 mm.

Shear Resistance: The shear resistance is a measure of the cohesiveness or internal strength of an adhesive. It is based upon the amount of force required to pull an adhesive strip from a standard flat surface in a direction parallel to the surface to which it has been affixed with a definite pressure. It is measured in terms of time required to pull a standard area of adhesive coated sheet material from a stainless steel test panel under a constant load.

The tests are conducted on adhesive strips applied to a stainless steel panel such that a 25 mm by 25 mm portion of each strip is in firm contact with the panel with one end portion of the tape being free. The panel with tape attached is held in a rack so that the panel forms an angle of 92° to the horizontal. A 1 kg weight is hung on the extended tape free end. Results are reported in minutes.

Haze: A BYK Gardner Haze Guard plus was used to measure the haze. The optical grade test samples are used, and release liner is removed before the measurement is made. The test is performed according to test method ASTM D1003. Results are reported in percents.

Color (& transmission): A BYK Gardner Color-sphere was used to measure the CIE L*a*b values (DIN6174) and % transmission over the visible range of the spectrum. The optical grade test samples are used and the release liner is removed before the measurement is made. The machine is used in transmission mode rather than reflection mode. The zero calibration is made using the optical grade PET film.

Viscosity: viscosity was measured with a rotational viscometer at 100° C. with defined shear rate of 100 s$^{-1}$, according to DIN EN ISO 3219. The viscosity value is expressed in mPa·s.

Abbreviations Used:
VAZO® 67=2,2'-azobis(2,4-diethylvaleronitrile), initiator
VAZO® 52=2,2'-azobis(2,4-dimethylvaleronitrile), initiator
nDDCM=n-dodecyl mercaptan, chain transfer agent
2EHA=monomer, 2-ethyl hexyl acrylate
MMA=methyl acrylate, monomer
MMA=methyl methacrylate, monomer
AA=acrylic acid, monomer
HBA=hydroxy butyl acrylate, monomer
MEHQ=hydroquinone monomethyl ether, stabiliser
DBTL=dibutyl tin dilaurate, ring opening catalyst
ADDITOL®TPO=diphenyl (2,4,6-trimethylbenzoyl) phosphine oxide, photoinitiator HDMAP=2-hydroxy-2-methyl-1-phenyl-propanone, photoinitiator TMPTA=trimethylolpropane triacrylate, tri-functional acrylate monomer General Procedure:

A 3 L double walled reaction vessel is charged with ε-caprolactone (b1) and an initiator as show in the table below. This reaction vessel is equipped with a stirrer, a water cooled condenser and an inlet for nitrogen and a thermo-probe mounted in the flask which is attached to a thermo-regulator for mass temperature control. The flask content is heated to 82° C. where the Vazo 67 initiator is used and 70° C. where the Vaszo 52 initiator is used. This is then stirred continuously while nitrogen is purged through the flask at a moderate rate. The monomer mixture M is then added to the reaction vessel over a 4 hour period. The polymerisation reaction takes place during this time to produce the (meth) acrylic copolymer (A) in ε-caprolactone. A post cook step of two hours at reaction temperature is conducted in order to decompose the majority of the un-reacted thermal initiator.

|  | Example | | | | |
| --- | --- | --- | --- | --- | --- |
|  | 1 | 2 | 3 | 4 | 9 |
| Charge vessel | | | | | |
| ε-caprolactone | 374.2 | 345 | 477 | 477 | 477 |
| Vazo 52 |  |  | 0.5 | 0.5 | 0.5 |
| Vazo 67 | 0.5 | 0.5 |  |  |  |
| Monomer mixture M | | | | | |
| Vazo 52 |  |  | 6.00 | 6.00 | 6.00 |
| Vazo 67 | 3.78 | 4.50 |  |  |  |
| DDMC | 5.4 |  | 8.54 | 8.54 | 8.54 |
| 2EHA | 531 | 645.00 | 886 | 886 |  |
| Butyl acrylate |  |  |  |  | 886 |
| MA | 294 | 214.5 | 315 |  |  |
| AA |  | 45 | 71 | 71 | 71 |
| HBA |  | 29.25 |  | 46.3 | 46.3 |
| MMA |  |  | 150 | 465 | 465 |
| ε-caprolactone |  |  | 85.4 | 85.4 | 85.4 |
| Ring opening reaction | | | | | |
| MEHQ | 1000 ppm | 1000 ppm | 1000 ppm | 1000 ppm | 1000 ppm |
| DBTL | 500 ppm | 500 ppm | 500 ppm | 500 ppm | 500 ppm |
| HBA | 156 | 72 | 232 | 232 | 232 |
| Formulation | | | | | |
| Additol TPO |  |  | 2 | 2 | 2 |
| HDMAP | 2 | 2 |  |  |  |

The second step (ring opening reaction) is performed at a mass temperature of 115° C. The nitrogen gas introduction is replaced by lean air containing 6% oxygen. 1000 ppm MEHQ stabiliser and 500 ppm DBTL catalyst is added to the reaction mixture before adding hydroxy butyl acrylate. This is added to the reaction mixture over a period of 30 min with the stirrer's rotational speed set to 120 RPM. This results in ring opening of the ε-caprolactone to produce a mono-functional ε-caprolactone acrylate compound. Ring opening is complete after 2 to 3 hours determined by HBA content by gas chromatography.

In the final step the mixture was formulated with 2% photo-initiator at 70° C. to give a UV curable PSA.

EXAMPLE 1

Following the above procedure and using the composition given in the table as Example 1, a colourless hazy resin is produced which has the following properties when cured in a 50 μm film.

| Adhesive properties | |
| --- | --- |
| Peel | 2 N/25 mm |
| Shear | 10 min |
| Optical properties | |
| Haze | 2% |
| Transmission | 98.88 |
| L | 99.65 |
| a | −0.114 |
| b | 0.562 |

Peel is low around 2N/25 mm and the shear is less than 10 min for a 25 mm square strip and a weight of 1 kg. The viscosity of the resin is 10.000 mPa·s at 100° C.

EXAMPLE 2

The above procedure is again followed this time using the composition given in the table as Example 2, in this case however there is a delay of 20 min between addition of the DBTL catalyst and addition the HBA. This allowed time for some ε-caprolactone to react with the —OH functionality on the polymer chain improving compatibility with the ε-caprolactone, HBA reacted compound B. This product is haze free and has improved optical and adhesive properties compared to example 1.

| Adhesive properties | |
| --- | --- |
| Peel | 11 N/25 mm |
| Shear | 200 min |
| Optical properties | |
| Haze | 0.5% |
| Transmission | 99.5 |
| L | 99.7 |
| a | −0.05 |
| b | 0.35 |

The viscosity of the resin is 4500 mPa·s at 100° C.

The PSA films are then aged in an oven at 85° C. for 312 hours and the optical properties are re-measured. This shows that here is no change in haze or transmission and only a very small increase in color.

| Optical properties | |
| --- | --- |
| Haze | 0.5% |
| Transmission | 99.5 |
| L | 99.7 |
| a | −0.13 |
| b | 0.57 |

EXAMPLE 3

The above procedure is again followed this time using the composition given in the table as Example 3 with MMA incorporated into the polymer chain, DBTL catalyst is then added followed immediately with 232 g of HBA. This product is haze free with good optical properties. In this case the peel is seen to improve.

| Adhesive properties | |
|---|---|
| Peel | 15 N/25 mm |
| Shear | 30 min |

EXAMPLE 4

The above procedure is again followed this time using the composition given in the table as Example 4 with all of the MA replaced by MMA in the polymer chain, DBTL catalyst is then added followed immediately with 232 g of HBA. This product is haze free with good optical properties. In this case we see that the peel adhesion has increased to around 20N/25 mm. Various formulations of this material give us a range of different adhesive and shear properties (examples 5 to 8).

| Adhesive properties | |
|---|---|
| Peel | 18 N/25 mm |
| Shear | 45 min |

EXAMPLES 5 to 8

The resin from Example 4 is formulated with TMPTA as shown in the table below in order to give examples 5 to 8. All of these examples were optically clear and haze free.

| | Example | | | |
|---|---|---|---|---|
| | 5 | 6 | 7 | 8 |
| TMPTA % | 1.5 | 3 | 4.5 | 6 |
| Results | | | | |
| Peel (N/25 mm) | 23 | 16 | 15 | 13 |
| Shear (min) | 2780 | 6420 | 10060 | >12700 |

EXAMPLE 9

The above general procedure is again followed this time using the composition given in the table as Example 4 with all of the 2EHA replaced by butyl acrylate in the polymer chain, DBTL catalyst is then added followed immediately with 232 g of HBA. This product is haze free with good optical properties. In this case the peel adhesion and shear are those listed in the table below. Various formulations of this material give us a range of different adhesive and shear properties (examples 10 to 14).

| Adhesive properties | |
|---|---|
| Peel | 17 N/25 mm |
| Shear | 460 min |

EXAMPLES 10 TO 14

The resin from Example 9 is formulated with TMPTA as shown in the table below in order to give improved shear performance, examples 10 to 14.

| | Example | | | | |
|---|---|---|---|---|---|
| | 10 | 11 | 12 | 13 | 14 |
| TMPTA % | 1 | 1.5 | 3 | 4.5 | 6 |
| Results | | | | | |
| Peel (N/25 mm) | 15 | 17 | 16 | 11 | 10 |
| Shear (min) | 2360 | 1940 | 2980 | >11700 | >11700 |

EXAMPLE 15

The composition given in example 4 is cast onto PET substrate at a thickness of 2 mm (2000 µm). This is cured by passing it one time under the UV curing lamp at 5 m/min. The sample is completely cured after one pass. This particular system allows the in depth curing of a very thick composition layer and gives high peel values and moderate shear.

| Adhesive properties | |
|---|---|
| Peel | 32 N/25 mm |
| Shear | 4 min |

The invention claimed is:
1. Process for the preparation of a radiation curable composition comprising at least one (meth)acrylic copolymer A and at least one radiation curable compound B, said process comprising:
(a) in a first copolymerization step, the preparation of a (meth)acrylic copolymer in the presence of at least one non-copolymerizable cyclic compound (b1) containing at least one

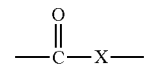

group in the cycle where X=O or NH, by copolymerization of a monomer mixture M comprising:
(i) from 40 to 95 wt % of at least one (meth)acrylic monomer (a1),
(ii) from 5 to 60 wt % of at least one other copolymerizable monomer (a2) different from (meth)acrylic monomer (a1),
with the proviso that said monomers (a1) and (a2) contain no functional group that can react with the cyclic compound (b1) during copolymerization,
(iii) optionally from 0 to 20 wt % of at least one copolymerizable monomer (a3) containing at least one functional group that can react with the cyclic compound (b1),
(iv) optionally from 0 to 5 wt % of at least one copolymerizable monomer (a4) containing at least one cyclic anhydride,
(b) in a subsequent ring opening step, the preparation of the radiation curable compound B by the ring opening of the cyclic compound (b1) with at least one radiation curable compound (a5) that contains at least one hydroxyl, carboxylic acid, amine, or thiol functional group,
wherein the percentages by weight are herein relative to the total weight of the monomer mixture M and the composition after radiation curing is a viscoelastic material which remains permanently tacky.

2. Process according to claim 1 wherein the cyclic compound (b1) is a lactone or a mixture of lactones.

3. Process according to claim 1 wherein the (meth)acrylic monomer (a1) is selected from alkyl(meth)acrylates whose homopolymers have a Tg of at most −30° C.

4. Process according to claim 1 wherein the (meth)acrylic monomer (a1) is selected from butylacrylate, iso-octylacrylate, 2-ethyl hexylacrylate and mixtures thereof.

5. Process according to claim 1 wherein the copolymerizable monomer (a2) is selected from monomers whose homopolymers have a Tg of more than −30° C.

6. Process according to claim 1 wherein the copolymerizable monomer (a2) is selected from methyl(meth)acrylate, ethyl(meth)acrylate, tertbutyl(meth)acrylate, vinyl acetate, styrene and mixtures thereof.

7. Process according to claim 1 wherein the copolymerizable monomer (a3) is selected from hydroxyalkyl(meth)acrylates, the ethoxylated and/or propoxylated derivatives thereof, the adducts thereof with lactones, polyalkoxy monohydroxy mono(meth)acrylates, (meth)acrylic acid, β-carboxyethyl(meth)acrylate, crotonic acid, maleic acid, fumaric acid, itaconic acid, and mixtures of any of them.

8. Process according to claim 1 wherein the copolymerizable monomer (a4) is selected from maleic anhydride, itaconic anhydride, 4-methacryloyloxyethyl trimellitate anhydride and mixtures thereof.

9. Process according to claim 1 wherein in the copolymerization step:
(i) from 5 to 60 wt % of cyclic compound (b1), and
(ii) from 40 to 95 wt % of the monomer mixture M
are used, the wt % are herein relative to the total weight of cyclic compound (b1) and monomer mixture M.

10. Process according to claim 1 wherein the radiation curable compound (a5) is selected from hydroxyalkyl(meth)acrylates, the ethoxylated and/or propoxylated derivatives thereof, the adducts thereof with lactones, polyalkoxy monohydroxy (meth)acrylates, (meth)acrylic acid, β-carboxyethyl (meth)acrylate, crotonic acid, maleic acid, fumaric acid, itaconic acid, and mixtures of any of them.

11. Process according to claim 1 wherein the equivalent ratio of cyclic compound (b 1) to functional groups of radiation curable compound (a5) is from 1:1 to 6:1.

12. Process according to claim 1 wherein
the monomer mixture M of step (a) comprises:
(i) from 40 to 94.5 wt % of (meth)acrylic monomer (a1),
(ii) from 5 to 59.5 wt % of copolymerizable monomer (a2),
(iii) from 0.5 to 20 wt % of copolymerizable monomer (a3),
(iv) optionally from 0 to 5 wt % of copolymerizable monomer (a4),
in order to prepare a (meth)acrylic copolymer comprising functional groups originating from copolymerizable monomer (a3) that can react with the cyclic compound (b1),
and where the process further comprises a grafting step
(c) wherein at least part of said functional groups are reacted with a part of the cyclic compound (b1).

13. Process according to claim 12 wherein the equivalent ratio of cyclic compound (b1) to the sum of the functional groups of copolymerizable monomer (a3) and radiation curable compound (a5) is from 1:1 to 6:1.

14. Process according to claim 12 wherein the grafting step (c) is conducted after the copolymerization step (a).

15. Process according to claim 1 wherein the monomer mixture M of step (a) comprises:
(i) from 40 to 94.5 wt % of monomer (a1),
(ii) from 5 to 59.5 wt % of copolymerizable monomer (a2),
(iii) optionally from 0 to 20 wt % of copolymerizable monomer (a3),
(iv) from 0.5 to 5 wt % of copolymerizable monomer (a4),
in order to prepare a (meth)acrylic copolymer comprising cyclic anhydride groups originating from copolymerizable monomer (a4),
and where the process comprises an adduct formation step
(d) wherein at least part of the cyclic anhydride groups is reacted with at least one radiation curable compound (a6).

16. Process according to claim 15 wherein the radiation curable compound (a6) is selected from hydroxyalkyl(meth)acrylates, the ethoxylated and/or propoxylated derivatives thereof, the adducts thereof with lactones, polyalkoxy monohydroxy (meth)acrylates.

17. Process according to claim 15 wherein the equivalent ratio of functional groups of radiation curable compound (a6) to cyclic anhydride groups of monomer (a4) is from 0.5:1 to 2:1.

18. Process according to claim 1 wherein the process further comprises a capping step (e) wherein a functional end group W that is formed by the ring opening of the cyclic compound (b1) at the ring opening step (b), or both at the ring opening step (b) and grafting step (c), is capped with at least one capping compound containing at least one functional group Y capable of reacting with the functional end group W.

19. Process according to claim 18 wherein the functional end group W is a hydroxyl or a primary amine and wherein the capping compound is a mono-, a di- or a polyisocyanate.

20. Process according to claim 1 wherein the process comprises an adduct formation step (d) and a capping step (e).

21. The process according to claim 1, further comprising including a tackifier in said composition.

* * * * *

UNITED STATES PATENT AND TRADEMARK OFFICE
CERTIFICATE OF CORRECTION

PATENT NO. : 9,708,515 B2
APPLICATION NO. : 14/119269
DATED : July 18, 2017
INVENTOR(S) : Graham Clark and Jurgen Van Holen It is certified that error appears in the above-identified patent and that said Letters Patent is hereby corrected as shown below:

In the Specification

Column 5, Line 5: After "(a1)", delete ")".

Column 5, Line 6: After "(a1)", delete ")".

Column 5, Line 36: Change "hydroxnonyl(meth)acrylate" to -- hydroxynonyl(meth)acrylate --.

Column 6, Line 24: Change "hydroxnonyl(meth)acrylate" to -- hydroxynonyl(meth)acrylate --.

Signed and Sealed this
Nineteenth Day of June, 2018

Andrei Iancu
*Director of the United States Patent and Trademark Office*